Patented Mar. 19, 1940

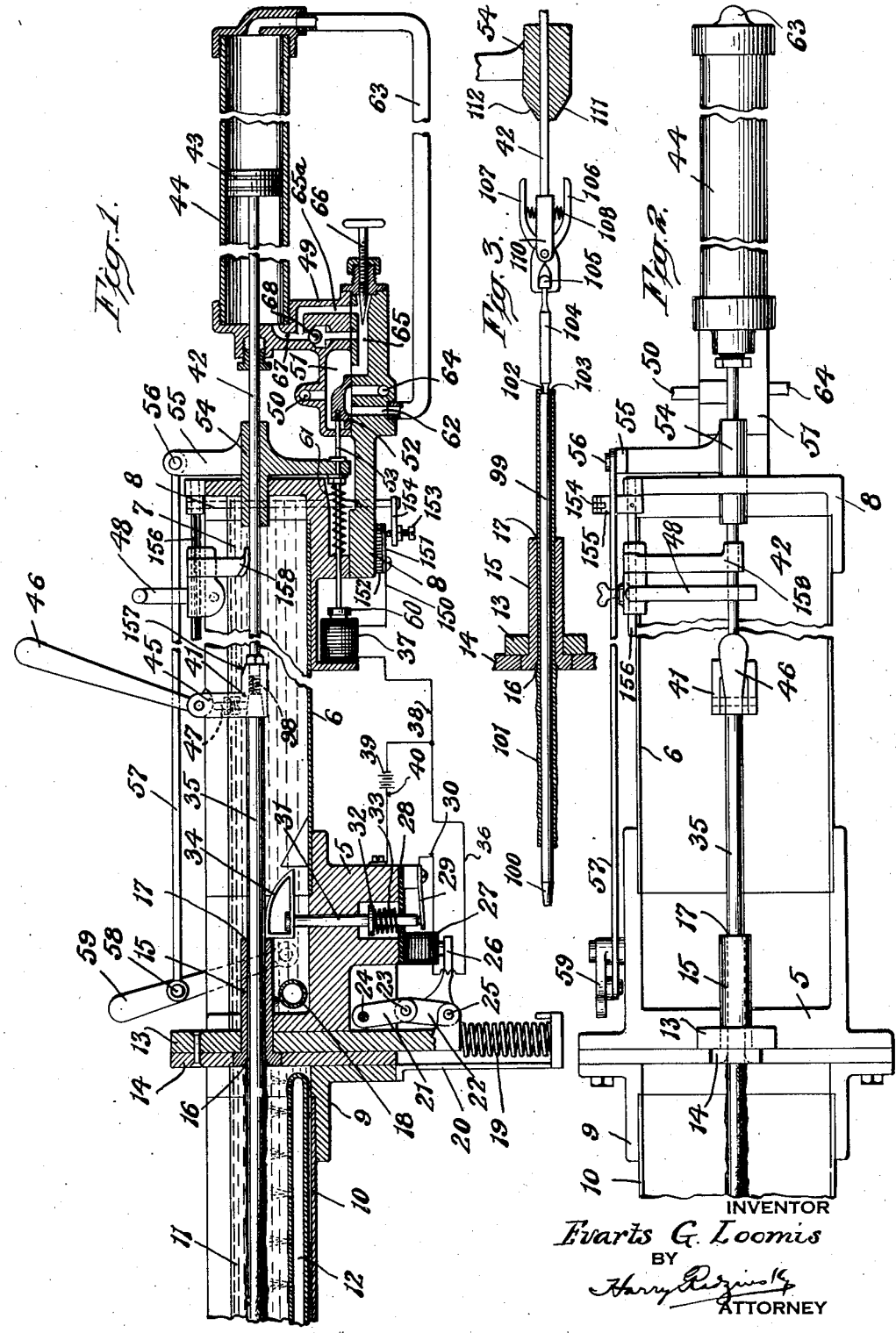

2,194,313

UNITED STATES PATENT OFFICE 2,194,313

METHOD AND APPARATUS FOR SHAPING THERMOPLASTIC RODS, TUBES, AND THE LIKE

Evarts G. Loomis, Newark, N. J.

Application June 26, 1937, Serial No. 150,480

12 Claims. (Cl. 18—5)

This invention relates to an improvement in an apparatus and method for making thermoplastic rods, tubes and similar elongated elements and has for its object the provision of an apparatus and method which will shape such rods and tubes speedily and effectively and whereby the outer surfaces of the rods, tubes and similar articles so produced, will be brought accurately to the shape and dimensions required without waste, and also render them smooth and polished if desired, without requiring additional polishing operations.

Most rods and tubing composed of thermoplastic materials of the cellulosic group are formed either by extrusion methods or by being cut from blocks of the material while the material is in a more or less soft state. After the rods or tubes are formed, shrinkage under change of temperature or by evaporation of solvents or for other reasons occurs and this tends to shrink, warp or distort the resultant article. Therefore, for more commercial purposes additional operations are required on the rod or tubes for the purpose of both straightening them out and bringing them within required uniform shape and dimensions. At the present time, this frequency means re-machining them, such re-machining operation being had on lathes, rotary cutting tools, saws and grinders of various kinds. Such operations require labor, equipment cost and maintenance and a considerable loss of material often cut away during the machining operations.

In the production of rods and tubes of thermoplastic materials, and particularly those of cellulosic nature, such articles as they leave the extruding or forming machinery, are, as previously stated, often irregular and distorted in shape. The surface of the rods and tubes are rough and irregular and consequently one of the subsequent finishing operations required is one which will smooth and often also polish the outer surfaces of the same. Such a turning or grinding operation requires not only the use of expensive machinery, but creates a substantial amount of waste of material. Material removed from the surfaces of the rods and tubes during a grinding operation becomes intermingled with the particles dislodged from the grinding wheels and a separation of the powdered plastic material from particles of the grinding wheels being impossible, a recovery of the plastic material after the grinding operation has taken place cannot be had. Also in turning or cutting to form the outside surfaces of the rod or tube, there is waste of scrap. Additionally, the sharpening and adjusting of cutters which soon grow dull, is also a consideration.

The primary object of the invention therefore is to provide means for accurately forming and finishing the outer surfaces of rods and tubes without the necessity of grinding or otherwise machining the surfaces of the same with frequently sharpening and resetting tools, thereby not only avoiding expensive waste of material, but producing the desired result more effectively and speedily.

A further object of the invention is the provision of means by which the rod or tube to be shaped and polished is softened by the application of a heated fluid and is chilled immediately as it passes through the forming and polishing operation, to thereby at once harden it in the formed shape and prevent the distortion or warping which occurs by irregular cooling after the shaping of a rod or tube of this character.

More particularly, the invention contemplates the provision of a die or dies disposed between tanks containing hot and cold liquids, and a means whereby rods, beading strips, sheets or tubes to be formed are drawn through the hot liquid and through the cold die or dies, and after passing through the die or dies, enters the cold liquid and is released from the die therein, where it remains until thoroughly cooled and hardened. The invention also contemplates the provision of means for drawing the rod or tube through the die and releasing it to permit it to drop into the tank of cold liquid after it has been completely drawn through the die.

A further feature of the invention consists of means for automatically closing the aperture through the die the instant the material being drawn through it has left it, thereby preventing the mixture of the hot fluid with the cold.

Another feature of the invention resides in the means by which the die is, while the device is in an inoperative condition, and at the completion of each drawing operation, elevated out of the heated fluid thus making it convenient to insert the reduced end of the next element to be drawn, into the entrance end of the die while the same is out of the heated fluid and also convenient for attaching the end of the element to the gripping means, said die while in its raised position providing valve action for preventing mixture of the heated fluid with the cold.

These and other objects are accomplished by the invention, a more particular description of which appears hereinafter and is set forth in the accompanying claims.

In the accompanying drawing, wherein an embodiment of the invention is set forth, Fig. 1 is a longitudinal sectional view through the apparatus made in accordance with this invention; Fig. 2 is a plan view of the same; and Fig. 3 is a sectional view through a die and other elements utilized for the shaping and finishing of tubes.

With reference to Figs. 1 and 2 of the drawing, 5 indicates a supporting bracket which receives and holds one end of a cooling tank 6 containing cold water 7 or a similar cooling fluid. The tank 6 is supported at one end by the bracket 5 and at its opposite end by a bracket 8, both brackets being mounted upon a suitable supporting base, not shown. Bracket 5 is bolted to another bracket or shelf 9 which supports one end of a heating tank or shallow receptacle 10, having its other end supported in any suitable way. Tank 10 contains hot water 11 or other fluid heating medium maintained at a high temperature by means of the steam pipe 12 disposed at the bottom of the tank 11 or by any other suitable heating means. Located between the two tanks 6 and 10 is a vertically movable slide 13 secured to an insulating plate 14. In slide 13 is secured a tubular die 15 having its interior round, oval, square or of any other sectional form desired. The die 15 may have its inner wall surfaces grooved, highly polished, or of any desired finish, and is mounted in slide 13 and plate 14 so that its entrance opening 16 is directed toward the hot water tank 10 and is, in fact, located in said tank when the die is in its lowered position. The greater portion of the body of the die 15 beyond the tapered entrance is located within the cold water 7 of tank 6 and the egress end 17 of the die is thus normally disposed in and surrounded by cold water 7. Said cold water 7 surrounding the greater portion of die 15 maintains the body of the die at a low temperature and this result is aided by means of a pipe 18 located in tank 6 below the die 15 and perforated to direct a spray of cold water constantly against the die. In drawing thermoplastic material a serious difficulty is caused by the poor thermoconductivity of such material. If the die through which the element to be shaped is immersed in cold water, which contrary to air, is a good conductor and an ideal heat absorbent, the heat calories can be removed much more rapidly than the thermoplastic material can transmit them. Hence when the rod or other element to be shaped emerges with a chilled, set exterior into a cold water bath, such set exterior is maintained and the thickness of such hard, set exterior increases inwardly toward the center of the element until the product is completely set in the desired form and dimensions and wholly without swelling or distortion.

The slide 13 has its lower end resting against the top of a coil spring 19 which is supported upon a bracket 20 secured to the lower end of the bracket 9. The slide 13 is connected to a toggle composed of the links 21 and 22 pivotally connected together at 23, the link 21 having its upper end pivoted at 24 in a recess in bracket 5 and the link 22 having its lower end pivoted at 25 at the lower end of the slide. Link 22 is formed with a projecting finger 26 adapted to be held by an electro-magnet 27 secured on an insulating material 28 secured on the lower end of bracket 5. A spring finger 29 forming a contact member of a switch is secured on the insulation 28, said finger being connected by wire 30 to the wiring of the electro-magnet. The finger 29 is located to receive the contact of a vertically movable stem 31 which is provided with a collar 32 against which spring 33 exerts an upward thrust to normally raise the stem 31 and hold it away from the finger 29. Stem 31 carries a shoe constituting a valve member, as well as a feeler 34 on its upper end and which remains in contact with the surface of the rod 35 of thermoplastic material, while the rod is being drawn through the die 15 in the manner to be hereinafter explained. As long as the rod 35 is being drawn through the die 15 and a portion of it is projecting out of the egress end 17 of the die, the feeler 34 will be depressed by the rod 35 thereby causing the stem 31 to be held downward against the tension of spring 33, to hold lower end of stem 31 against the spring contact finger 29 in the position shown in Fig. 1. As soon as rod 35 has been completely drawn through the die 15, and leaves the die, spring 33 will force the stem 31 upward to thereby break contact between stem 31 and spring finger 29, thus shutting off the flow of current to magnet 27. When this occurs, the holding effect of the magnet on finger 26 is released and the toggle will "break" at pivot 23 permitting the spring 19 to elevate the slide 13 and raise die 15 above the surface of the hot water in tank 11 and the cold water 7 in tank 6. When stem 31 is elevated, the member 34 extends over and closes the egress end 17 of the die, thereby preventing the hot water 11 from contacting or mixing with the cold water 7.

One end of the wiring of magnet 27 is connected by wire 36 to battery 39 or other source of current. The opposite side of the battery connects, by wire 40, to the bracket 5, which being of metal, electrically connects to the stem 31 as will be clearly understood. Thus, when stem 31 is in contact with finger 39 the magnet 27 will be energized.

The rod of thermoplastic material 35 to be drawn through the die 15 in rough unfinished form is inserted in the entrance end 16 of the die while the slide 13 is in its raised position above the hot water 11, thus permitting the rod to be manually inserted without requiring the insertion of the hand into the hot water. One end of the rod 35 manually thrust through the die 15 is previously slightly reduced to enable said end portion of it to be manually projected out of the egress end 17 of the die for engagement by a clamp 41 secured on the end of a piston rod 42, the opposite end of said rod being connected to piston 43 mounted for reciprocation in a cylinder 44. The clamp 41 is provided with an operating handle 46 having a cam-shaped end 45 which depresses a spring-pressed plunger 47 within the clamp to cause it to grip the end of the rod 35 and hold it. The edge of the tank 6 is provided with an adjustable stop 48 which, when the rod 35 has been completely drawn through die 15, contacts with handle 46 and throws it to the left, as viewed in Fig. 1, to disengage the clamp from the end of the rod 35 allowing the rod to fall down into the tank 6. Piston 43 attached to rod 42 is reciprocated in cylinder 44 by hydraulic means. A housing 49 secured on one end of the cylinder contains the passages for the hydraulic fluid which enters into one end of the cylinder to force the piston in one direction, and at another time enters into the opposite end of the cylinder to force piston 43 in a reverse direction. The entrance passage for the hydraulic fluid into the housing 49 is indicated at 50, said fluid then passing into a manifold portion 51 in the housing, wherein a slide valve 52 is located. Valve 52 is secured to a stem 53 projecting out of housing 49 and attached to a spider 54, slidable in bracket 8 and also slidable on the rod 42. Said spider 54 is formed with a projecting arm 55 to which a link or rod 57 is pivoted at 56, said link having its opposite end pivoted at 58 to an operating handle 59, having its lower end pivoted on one of the side portions of bracket 5. Stem 53 is provided with a head 60 adapted to be held by a magnet 37 against the tension of spring 61 surrounding stem 53. When the stem is so held by the magnet 37 the valve 52 is then covering passage 62 leading from chamber 51 and communicating, through pipe 63, with the right-hand end of cylinder 44, when viewed as in Fig. 1, said valve at the same time covering the waste passage 64. (See Fig. 1.)

With the parts in this position, the hydraulic fluid entering through entrance passage 50 will enter manifold 51 and thence proceed through a passage 65 past needle valve 66 into passage 65a and then into the left end of cylinder 44 to force piston 43 toward the right, causing the rod of thermoplastic material 35 to be drawn through the die 15 and to the right as clearly shown in Fig. 1. It is desirable to move the rod 35 through die 15 at a relatively slow rate of speed and for this reason, the flow of hydraulic fluid through passages 65 and 65a to the left end of cylinder 44 is governed or regulated by means of the needle valve 66. As the fluid is entering the left end of cylinder 44, the fluid in the cylinder to the right of the piston 43 is forced out through passage 63 and through communicating passage 62 through the waste outlet 64.

One end of magnet 37 connects to the battery or other source of current by the wire 38, the other end thereof being connected by wire 150 to a contact member 151 secured on the strip of insulation 152. A circuit-closing member 153 is attached at the end of an arm 154 which extends under tank 6 and has its upper end pivotally connected to an arm 155 secured on a rocking shaft 156 mounted in bracket 8 and also in the stop 48. Shaft 156 is keyed and receives a weighted finger 158 which can be moved back and forth longitudinally of said shaft as the stock 48 is moved, but since it is keyed on said shaft it will impart a rocking movement to the shaft as it is raised by contact with a cam surface 157 formed at the end of clamp member 41. Thus, when cam surface 157 engages under the end of finger 158, it lifts the finger, causing shaft 156 to be rocked thereby causing arm 154 to move circuit-closing member 153 away from the contact 151 to break circuit to magnet 37. When the circuit to magnet 37 is broken, and magnet 37 releases the head 60 of rod 53, the spring 61 will force valve 52 to the right to cause it to uncover passage 62 and cover the passages 65 and 64. Now, fluid entering through the inlet 50 and into manifold chamber 51 will pass through passage 62 and tube 63 and into the right end of cylinder 44 to exert pressure against the top of piston 43 to force rod 42 to the left. As passage 62 is unimpeded, the pressure of the hydraulic fluid will force the piston 43 to the left much more rapidly than when the piston is forced to the right while drawing the tube 35 through die 15. The hydraulic fluid then located to the left of piston, is during this operation, forced out of the cylinder through passage 67 and into passage 65 and finally out through the waste passage 64. A check valve 68 is located in passage 67, this valve closing passage 67 when hydraulic fluid is entering through passage 65 and opening passage 67 when fluid to the left of piston 43 is being forced out of the cylinder through passage 67 and finally to the waste passage 64.

Briefly, the operation of the apparatus is as follows:

In its position of rest when there is no rod to be shaped in position in the die, the feeler 34 is in a raised position by action of spring 33, said feeler also at this time closing egress end 17 of the die. The rod 31 is thus out of contact with finger 29 so that the magnet 27 is not energized at this time. Consequently spring 19 raises the slide 13 which holds the die raised above the level of the hot water 11 in tank 10. While the die is in that raised position, the operator inserts the reduced end of the roughly formed thermoplastic rod through the die until the end protrudes for a short distance from the egress end 17 of the die. Clamp 41 is at this time located at the egress end of the die and it is manually operated to cause it to engage the protruding end of the thermoplastic rod. As the die is in a raised position at this time, rod 42 on which the clamp is secured, is on account of its length quite flexible and is readily sprung slightly upwardly to enable the clamp to be engaged with the end of the thermoplastic rod. When the clamp has been engaged with the end of the thermoplastic rod, slide 13 is manually pushed downward which brings the projecting end portion of the thermoplastic rod into contact with the feeler and valve, thus depressing the same and causing the electric circuit for the magnet 27 to be closed by contact of stem 31 and spring finger 29. When the slide 13 is depressed as just explained, hand lever 59 is swung to the left, as viewed in Fig. 1, this action tending to move the spider 54 in the same direction, causing it to move stem 53 against the tension of spring 61 and bring the head 60 on the stem into contact with the energized magnet 37 which holds the stem. When the stem 53 is so held by the magnet, passage 65 is open and the flow of hydraulic fluid entering through inlet 50 will pass from manifold 51 through passage 65 past needle valve 66, into passage 65a and then into the left end of the cylinder and will force the piston 43 to the right. Since the needle valve will regulate the flow of the fluid into the cylinder, the speed at which the piston is moved can be regulated so that the piston can be made to move relatively slowly and the thermoplastic rod 35 drawn slowly through the die 15. When the rod 35 has been drawn completely through the die, the handle 46 strikes the stop 48, said stop being positioned according to the length of the rod to be drawn through the die, and the clamp 41 releases its grip on the end of the thermoplastic rod, which is at once ejected from the clamp by means of the spring 98, located within the clamp and against which the end of the thermoplastic rod abuts when it is gripped by the clamp. Since the opposite end of the rod has by this time passed through the die and is no longer supported thereby, the rod will, when ejected by the clamp, fall to the bottom of the tank 6 and may be permitted to lie in the cold water therein until it has been thoroughly cooled and will retain its fixed, final shape. As the rod is released by clamp 41 cam surface 157 on the clamp engages finger 158 and lifts it thereby breaking circuit to the magnet 37.

When the thermoplastic rod is thus released from the die and clamp and falls away from the same, feeler 34 springs upwardly, thus breaking circuit to the magnet 27, causing slide 13 to be elevated to carry the die upwardly and out of the hot and cold water and closing the egress opening 17 of the die. Since the action of cam surface 157 has caused magnet 37 to release stem 53, said stem slides to the right to uncover passage 62 and cover passage 65 to reverse direction of movement of the piston 43 in cylinder 44. The flow of hydraulic fluid may now move unimpeded through passage 63 against the right end of piston 43 and the fluid at the left end of said piston may be similarly speedily ejected through passage 67, and the return movement of clamp 41 to a position near the egress end of the die 15 is accomplished at a greater speed than the drawing of the rod took place. It will be noted that the body of the thermoplastic rod 35, while being drawn slowly through die 15, is located in the hot water 11 so that the body of the rod while being fed to the die is softened by this application of heat. The greater part of the die is chilled or cooled and as the rod is shaped by being drawn through the die, it is thus cooled not only by the die itself but by being moved through the body of cold water 7 in tank 6. The rod after having been drawn completely through the die may remain in the cold water for any desired period of time and until completely cold and it will be found that this avoids distortion in the finished product. The inner surfaces of the die 15 may be highly polished or given any desired shape or finish in section and consequently the rod 35 when drawn through the die will not only be of uniform diameter but will be provided with the dimensions, shape and finish of the die as required throughout its length so that the usual turning, grinding or other operations necessary to produce a finished surface in the product are quite unnecessary.

In Fig. 3 is shown a means for drawing tubes through the die 15 as distinguished from the solid rod disclosed at 35 in Fig. 1. When a tube is to be drawn. it is first mounted upon a mandrel shown at 99 in Fig. 3. The mandrel is in the form of a metal rod having a tapered end 100 which permits it to be inserted through the roughly shaped thermoplastic rod 101. The mandrel 99 is formed with an annular recess 102 into which the end of the tube 101, while in a relatively soft condition, is turned over as shown at 103 in Fig. 3. The mandrel may also be provided with a projecting part 104 terminating in the head 105 which is engaged by a gripper. The gripper may comprise a pair of pivotally connected jaws 106 and 107, provided with a spring 108 which tends to hold the ends of the jaws together to engage over the head 105 of mandrel 99 as clearly shown in Fig. 3. The gripper 106 is mounted in yoke 110 secured on the end of piston rod 42. In the construction shown in Fig. 3, the inner end of the spider 54 is provided with inclined surfaces 111 and 112 which contact with the free ends of the jaws 107 and 108 causing the opposite ends of the jaws to be spread apart to thereby release their engagement on the head 105 of the mandrel 99. This occurs at the time when the entire tube 101 has been drawn through the die so that upon the release of the end of the mandrel in the manner explained, the mandrel and tube will fall down into the bottom of tank 6 and be cooled by the cold water 7 therein. After the tube has been thoroughly cooled, it is removed from the mandrel by breaking away the inturned portion 103 so that it can be slid from the mandrel.

In the embodiment of the invention shown, the rod or tube being formed is softened by means of the hot water and is immediately cooled as fast as it is drawn through die 15 by the cold water in tank 6. By this method of forming the rod or tube, the rod or tube becomes set and hardened on its exterior and remains so as it is drawn, whereby the distortion and irregularity in shape generally found in tubes of this character is completely eliminated and the finished drawn tube possesses the shape, diameter and a finished, smooth exterior surface, or it can be grooved or have any other exterior desired to correspond to the form and surface of the interior of the die.

The same idea of means may be used in a similar manner and principle to produce beading, rectangular, polygonal, grooved, curved, strip, sheet, or any other cross sectional form of thermoplastic element. The particular form so produced is dependent merely upon the internal shape of the die or dies employed. The dies employed may be used in group formation or in gangs, as will be clearly understood.

What I claim is:

1. In an apparatus of the character described, a receptacle containing a heated fluid, a receptacle containing a cold fluid, a die having its mouth disposed in the heated fluid and its body portion and egress end disposed in the cold fluid, a gripping member for engaging the end of a thermoplastic rod or tube projecting out of the egress end of the die, means for moving the gripping member away from the die to cause it to draw the rod or tube through the die, means for releasing the gripping member from engagement with the rod or tube when the rod or tube has been drawn through the die, and means for moving the gripping member to a position near the die after it has released its engagement with the rod or tube.

2. In an apparatus of the character described, a receptacle containing a heated fluid, a receptacle containing a cooling fluid, a die having its mouth disposed in the heated fluid and its egress end disposed in the cooling fluid, means for moving the die out of both fluids to permit the insertion of a rod or tube in the mouth end of the die, gripping means for engaging a portion of the rod or tube projecting from the egress end of the die, means for moving said gripping means away from the die to cause said means to draw the rod or tube through the die to thereby shape it and simultaneously finish the outer surface of it, means for releasing the gripping means from the rod or tube when the rod or tube has been drawn through the die, whereby the rod or tube will remain in the cooling fluid.

3. In an apparatus of the character described, a hot water tank, a cold water tank, a die located between the two tanks and situated with its mouth in the hot water tank and its egress end in the cold water tank, means for elevating the die above the water in the tanks, a gripping element for engaging a rod or tube and drawing it through the die, means for moving the gripping element to and from the die, means for disengaging the gripping element from the rod or tube after it has drawn the rod or tube through the die, to thereby cause the rod or tube to remain in the cold water tank, means for causing the gripping means to reverse its direction of movement with respect to the die, said last mentioned means being controlled by the rod or tube moving through the die.

4. In an apparatus of the character described, a tank containing a heated fluid, a tank containing a cold fluid, a die located between the tanks and having its entrance end directed toward the heated fluid tank and its egress end directed toward the cooling fluid tank and located therein during the drawing operation, and means for drawing a rod, tube, or similar pre-shaped elongated section of thermoplastic material through the die from the tank containing the heated fluid directly and progressively into the tank containing the cold fluid.

5. In an apparatus of the character described, a fluid heating tank for heating a rod, tube or similar article to be shaped, means for cooling said article after having been shaped, a die located to receive the article to be shaped directly from the heating means, said die having its egress end situated to deliver the shaped article directly from said end to the cooling means as the article progressively emerges from the die, means for drawing the article through the die, and means for causing said drawing means to release the article while in the cooling means after it has drawn the article through the die.

6. In an apparatus of the character described, heating and cooling tanks containing hot and cold liquid respectively, a drawing die disposed between the tanks and having its entrance end located in the hot liquid and its egress end located in the cold liquid, means for engaging a rod, tube or similar elongated thermoplastic element at the egress end of the die and drawing it through the die from the hot liquid to the cold liquid, means for causing the die to be moved out of the hot and cold liquid instantly when the element has been released by the drawing means and has passed out of the egress end of the die, and means for releasing said element-drawing means from its engagement with the element and into the cold liquid after it has drawn the element through the die.

7. In an apparatus of the character described, heating and cooling tanks containing hot and cold liquids respectively, a die disposed between the tanks, said die when in operation having its entrance end disposed in the heating tank and its egress end located in the cooling tank, a gripping element for engaging the end of a rod, tube or similar elongated thermoplastic element at the egress end of the die and drawing it through the die, means for moving said gripping element away from the die to cause the element gripped by it to be drawn through the die, feeler means engaging the thermoplastic element at the egress end of the die while said element is being drawn through the die, and means connected to said feeler means for raising said die aperture above the liquids, and means for reversing the direction of movement of the gripping element to move it toward the die when the thermoplastic element has been completely drawn through the die and has moved out of the same and out of contact with the feeler means.

8. In an apparatus of the character described, a drawing die located between a hot and cold fluid medium, means for holding said hot and cold media the die having one end disposed in the hot medium and the opposite end disposed in the cold medium while a thermoplastic material is being drawn through said die so that the thermoplastic material emerging from the die enters directly and progressively into the cold medium, means for moving the die out of the hot and cold media as soon as the thermoplastic material leaves the egress end of the die, and a feeler mechanism for controlling the operation of said means, said feeler mechanism being controlled by the material as it passes through the die.

9. In an apparatus of the character described, means for containing hot and cold fluids, a die located between said hot and cold fluids while thermoplastic material is passing through said die, feeler-controlled means for moving the die out of the fluids as soon as the thermoplastic material leaves the egress end of said die, and means for causing the feeler to close one end of the die as soon as the thermoplastic material is passed out of said end.

10. In an apparatus of the character described, means for containing hot and cold fluids, a drawing die for thermoplastic material mounted with its entrance end in the heated fluid and its exit end in the cold fluid, said die being located under the level of said hot and cold fluids, a support for said die constituting a division and an insulating separator between the two fluids, and means for automatically raising the die above the fluids as soon as the thermoplastic material has passed out of the egress end of the die into the cold fluid.

11. The method of shaping and surfacing thermoplastic rods and tubes of cellulosic nature comprising, moving a rod or tube to be accurately shaped and surfaced through a hot medium to soften the same, moving said heated rod or tube through the heated entrance of a metal die and through a cold egress end of said die and progressively through a cold fluid medium as it emerges from the die.

12. The method of shaping and accurately surfacing thermoplastic rods, tubes or other elements comprising, moving a rod, tube or other element to be shaped through hot liquid, drawing it through the hot entrance and into a cold-bodied metal die, and delivering it directly and progressively from the egress end of the die into cold liquid.

EVARTS G. LOOMIS.